March 18, 1958 E. S. WAHL 2,826,891
VINE SEPARATOR ATTACHMENT
Filed July 20, 1956

ESTHER S. WAHL
INVENTOR
BY
ATTORNEYS.

United States Patent Office 2,826,891
Patented Mar. 18, 1958

2,826,891

VINE SEPARATOR ATTACHMENT

Esther S. Wahl, Saginaw, Mich.

Application July 20, 1956, Serial No. 599,113

2 Claims. (Cl. 56—314)

This invention relates to a vine separator attachment for a vine digger or puller.

An object of this invention is to provide an attachment for a vine puller which will lift and laterally shift the vine in front of the tractor wheels so that the wheels will not ride over the vines.

Another object of this invention is to provide a vine separator which will gravitatingly swing downwardly to operative position and will swing rearward and upward when the point strikes a furrow or small ditch.

A further object of this invention is to provide a vine separator attachment which is simple in construction and can be easily mounted on the transverse beam or bar which forms a part of the pulling means.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing.

Figure 1:
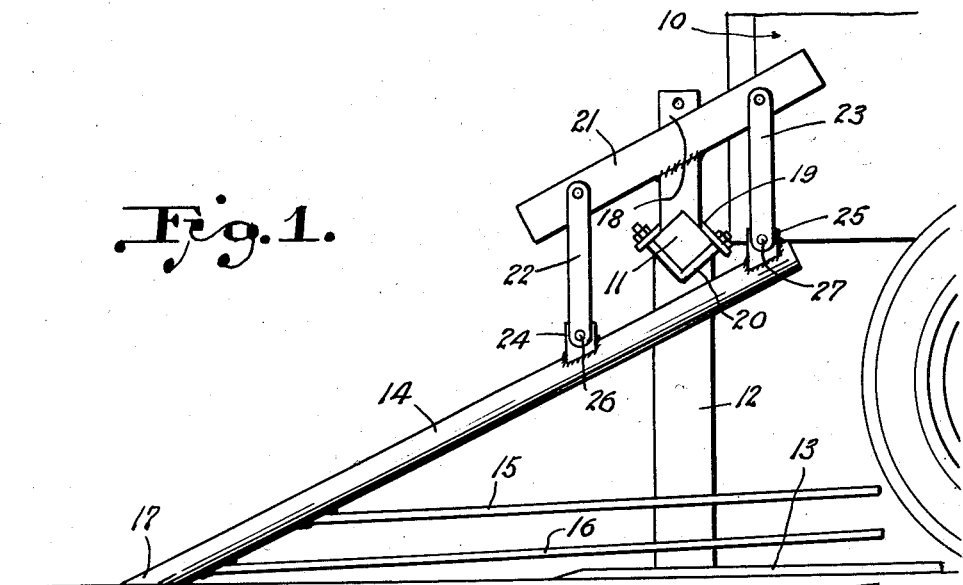
Figure 1 is a detail side elevation of a vine separator mounted on the front end of a tractor.
Figure 2:
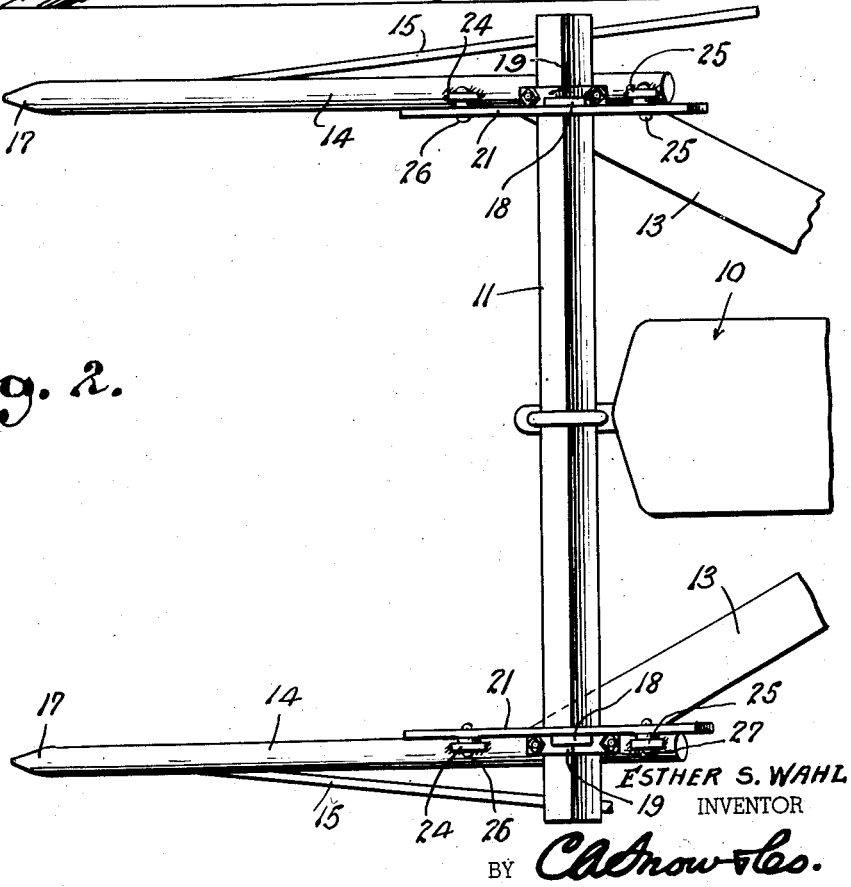
Fig. 2 is a plan view of the device mounted on the tractor.

Referring to the drawing, the numeral 10 designates generally a tractor and the numeral 11 designates a horizontally disposed beam which is mounted on the front of the tractor transverse to the movement thereof. The beam 11 has extending downwardly therefrom adjacent each end, a vertically disposed shank 12 having a vine puller blade or picker 13 at the lower end thereof. These vine pullers or pickers 13 are horizontally disposed and are inclined rearwardly and inwardly, as shown in Fig. 2.

In order to provide a means whereby any vines such as bean vines or the like, may be directed downwardly and out of the way of the wheels of the tractor 10, I have provided a pair of separators. These separators are of like construction and each is formed of a downwardly and forwardly inclined separator and leader bar 14. Bar 14 has fixed adjacent the lower forward end thereof a pair of rearwardly projecting rods 15 and 16 which are directed outwardly so that any vines which may be lifted by the bars 14 will be pushed outwardly of the line of travel. The bar 14 at its forward end is provided with a point 17 which is adapted to engage beneath any front vines or any vines which may be in the path of the tractor wheels. The bar 14 is swingably supported from the beam 11 by means of an upwardly disposed shank 18 which has a V-shaped clamping member 19 secured to the lower end thereof. Clamping member 19 engages over the beam 11 and a V-shaped bolt 20 engages about the opposite faces of the beam 11 and extends through the outer lower ends of the clamping member 19. The shank 18 has fixed thereto a downwardly and forwardly inclined suspension bar 21. The bar 21 has pivotally secured thereto front and rear links 22 and 23. The bar 14 has secured to the upper side thereof a pair of lugs 24 and 25 and the lower ends of the links 22 and 23 are pivotally secured to the lugs 24 and 25, by means of pivot members 26 and 27, respectively.

In the use and operation of this separator means, the bar 14 will be firmly disposed in a forwardly and downwardly inclined position with the point 17 disposed closely adjacent the surface of the ground. In the event any obstruction, ditch or furrow is encountered by the point 17, the bar 14 will swing upwardly and rearwardly until the obstruction is passed. As the fallen or bent vines are raised by the separator bars 14 these vines will also be shifted laterally by means of the rods 15 and 16.

These separators may be readily mounted on the puller carrying beam 11 which is conventionally mounted on the front end of a tractor when it is desired to use the tractor for vine pulling.

What is claimed is:

1. In combination, a transverse horizontal beam for attachment to a tractor, a pair of vine pickers carried by said beam, a vine separator forwardly of each picker, each separator comprising an elongated downwardly and forwardly inclined bar including a tapered point at the forward lower end thereof, a vertical shank, means securing said shank to the upper side of said beam, an obliquely inclined suspension bar fixed to said shank parallel to said separator, a pair of normally vertical links pivotally secured at each end between said suspension bar and said first named bar, and a pair of parallel substantially horizontally disposed rods secured to said first named bar adjacent the forward end thereof and projecting rearwardly and laterally outwardly therefrom.

2. In a vine puller having a horizontal supporting beam, a vine separator attachment comprising a U-shaped clamping member, means securing said clamping member to said beam, an upstanding shank fixed to said clamping member, an obliquely inclined suspension bar fixed to said shank, a downwardly and forwardly extending separator bar substantially parallel to said suspension bar, a pair of normally vertical links pivotally secured at each end between said suspension bar and said separator bar, and a pair of rearwardly extending laterally outwardly projecting rods fixed to the lower forward portion of said separator bar.

References Cited in the file of this patent

UNITED STATES PATENTS

| | | |
|---|---|---|
| 2,064,480 | Lock et al. | Dec. 15, 1936 |
| 2,466,555 | Paine et al. | Apr. 5, 1949 |
| 2,709,326 | Coombe | May 31, 1955 |